Figure 1:
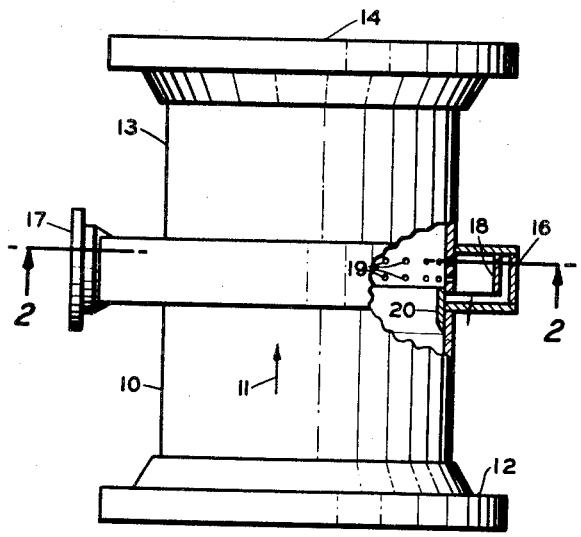

March 9, 1954     G. W. McCULLOUGH     2,671,652
SUBMERGED-BLAST SPARGING APPARATUS Filed June 6, 1949     2 Sheets-Sheet 1

INVENTOR.
G. W. McCULLOUGH
BY Hudson & Young
ATTORNEYS

March 9, 1954

G. W. McCULLOUGH 2,671,652

SUBMERGED-BLAST SPARGING APPARATUS

Filed June 6, 1949

2 Sheets-Sheet 2

INVENTOR.
G.W. McCULLOUGH

BY Hudson & Young

ATTORNEYS

Patented Mar. 9, 1954

2,671,652

UNITED STATES PATENT OFFICE 2,671,652

SUBMERGED-BLAST SPARGING APPARATUS

Gerald W. McCullough, Bartlesville, Okla., assignor to Phillips Petroleum Company, a corporation of Delaware Application June 6, 1949, Serial No. 97,467

7 Claims. (Cl. 261—121)

This invention relates to a new and improved sparger for introducing a gas or vapor into a conduit through which a liquid is flowing. One aspect of this invention relates to an improved apparatus for sparging a vapor reactant into a stream of liquid with which it will react or by which it is dissolved. In another embodiment, this invention relates to a device for sparging a vapor into a liquid which allows for longitudinal movement of the liquid-carrying conduit. In a specific aspect my invention relates to an apparatus for sparging vaporous ammonia into an aqueous stream of an ammonium salt in such a manner that water-hammer which often accompanies such introduction is eliminated.

The term "sparger" as referred to in this specification is used to identify an apparatus comprising in combination expansible means and means for introducing gaseous or vaporous material into a flowing stream of liquid in said expansible means with which the gas or vapor interacts. The term also applies to a complete expansible and vapor introducing assembly which may be inserted in a conduit. A sparger of this type is well adapted for use in the manufacturing of salts of ammonia by direct neutralization of ammonia with a suitable acid. In such an apparatus a vapor is admitted through a perforate section of conduit and the pulsation of the reacting liquid and movement of the conduit is absorbed or cushioned by an expansible means comprising a fluid-tight housing disposed circumferentially about and attached along its edges to the conduit, enclosing a slidable joint formed between longitudinal sections of conduit.

In a plant such as that used for producing ammonium salts or other crystalline materials by evaporation of the solvent from the solute, the solution of the material to be crystallized is evaporated until it is in the concentration range between saturation and supersaturation. Theoretically, no crystals will be formed until the saturation tends to be beyond the point of supersaturation at which time crystal nuclei will form. However, it is known that other factors such as agitation and the like will cause crystal formation before complete supersaturation is reached. In actual plant operation the solution of material to be crystallized is evaporated to an optimum point between the point of normal saturation and supersaturation at which a minimum of crystal nuclei will be formed and yet appreciable supersaturation is obtained.

A suitable apparatus for carrying out such an evaporation and crystallization process may comprise an evaporator positioned above a crystallizer and connected thereto by means of a barometric leg which extends into the crystallizer. The solution which is supersaturated in the evaporator is passed downward through the barometric leg to the crystallizer where it contacts crystals thus causing them to grow, and thereby relieving some of the supersaturation. The solution which is no longer as saturated as it was before it entered the crystallizer is then passed through a riser back to the evaporator. Additional acid or other material, depending on the product being made, is introduced to the solution at a point along the riser. Reactant gas such as anhydrous ammonia is added above this point by means of a sparger in a sufficient quantity to react with almost all of the acid and thus form more ammonium salt. The injection of the gaseous reactant into the riser will result in boiling and bumping of the liquid in the conduit. There may also be considerable pounding or water-hammer due to the rapid collapsing of the bubbles of vapor as they react with the liquid or as they are dissolved therein. I have also found that water-hammer is caused by too little pressure differential between the sparger and the riser. Because of this an ammonia pressure builds up in the sparger and then finally becomes great enough to be released into the riser through the large opening provided for expansion. Liquid immediately rushes into the sparger through this opening and hits the walls thereof, making the noise known as water-hammer. Consequently, it is essential that some means be provided for cushioning the apparatus to avoid damage from pulsations caused by the water-hammer.

Further, the addition of the vapor to the liquid and the reaction between them often causes a rise in temperature of the liquid and a consequent expansion of the conduit or riser through which the material is carried to the evaporator. Thus, it is also necessary to provide a suitable means for expansion and contraction, particularly longitudinally so that neither the evaporator nor the crystallizer or pumping equipment in the riser is damaged.

For efficient sparging of a vapor into a stream of liquid with which it reacts or by which it is rapidly dissolved, I have found that the vapor should be introduced in a plurality of small streams preferably uniformly distributed in relation to the liquid stream. If the vapor is admitted through relatively large inlets, the reaction with the liquid reactant or dissolution therein becomes violent and causes the previously discussed water-hammer. When such a practice is followed, a portion of the vapor is often not reacted thus causing an economic loss of materials because the vapor will be lost in the evaporation step. This is especially true when the reactant vapor is relatively volatile which is the case with ammonia. By using the apparatus of my invention, the difficulties often encountered when sparging a vapor into a liquid are eliminated.

An object of this invention is to provide an improved apparatus for introducing vapor into a liquid.

Another object of this invention is to provide an improved apparatus for introducing vaporous reactant into a liquid with which it is reacted or by which it is dissolved.

Another object if this invention is to substantially reduce the water-hammer occasioned at the point of introduction of vapor into a flowing liquid reactant or solvent.

Another object is to provide an improved apparatus for introducing anhydrous ammonia gas to an acidic solution of an ammonium salt.

Still another object is to provide an improved apparatus for the manufacture of ammonium salts.

Another object is to provide an improved apparatus for the manufacture of ammonium sulfate.

Other objects and advantages of my invention will be apparent to one skilled in the art from the accompanying disclosure and discussion.

In accordance with my invention I provide an improved sparging apparatus which permits longitudinal expansion and contraction of the conduit in which it is installed without leaving an expansion opening therein through which the gas to be sparged would pass into the liquid carrying conduit in preference to passing through perforations provided in said sparging apparatus.

One embodiment of the sparger of my invention comprises two portions of a liquid carrying conduit, the near ends of which are in axial relationship with one another. The ends of the portions of conduit nearest each other are so shaped and designed that the downstream end of the upstream portion of conduit fits in the upstream end of the downstream portion of conduit and slidably engages same thereby providing for longitudinal movement. The ends of the portions of conduit nearest each other are surrounded by a circumferentially disposed fluid tight bustle ring, preferably of an elliptical cross-section, which allows longitudinal movement. Perforations are provided in the portion of the conduit encompassed by the bustle ring for passing vapor such as ammonia, carbon dioxide, etc., therethrough into the conduit. An inlet preferably tangentially positioned is provided in the bustle ring for introducing the vapor to be passed into the conduit thereto. It is within the scope of this invention to utilize more than one inlet to the bustle ring, and such inlets may be positioned other than tangentially.

According to another concept of my invention, the perforations in the conduit may be placed in another location than in the area surrounded by the bustle ring. When this is done the inlets to the bustle ring are eliminated and it merely acts as a particularly advantageous type of expansion joint. In this embodiment the perforations are contained within a suitable means for introducing vapor thereto. Such means may comprise a bustle ring similar to the type surrounding the near ends of the conduit portions or may be of other suitable design. Inlet means are provided for introducing vapors to this bustle ring similar to those used in the first and preferred embodiment of my invention. It is also within the scope of this embodiment of my invention to utilize more than one area or group of perforations in the conduit and therefore more than one bustle ring and inlets thereto for providing vapor to be passed through said perforations.

In either of these embodiments of my invention, a spiral baffle ring more fully disclosed and discussed with regard to the attached drawings may be used for directing the flow of vapor around the conduit. However, the sparger of my invention may be operated without such a baffle ring being present, particularly when more than one vapor inlet is provided in the bustle ring. When such a baffle ring is used in a sparger where the perforations in the conduit are within the area encompassed by the bustle ring which encloses the near ends of the portions of conduit, only one edge of said ring is attached to the bustle ring thus still allowing flexibility of the bustle ring. When the perforations are in another portion of the conduit, it may be attached by both edges, if desired.

The term "end" used in this specification and claims, in respect of the portions of conduit so designed that they slidably engage one another, refers to that portion of the conduit which is so designed or shaped as to form the slidable engaging portions thereof and which allows for longitudinal movement of the two portions of conduit. It may include a circumferential ring welded to the downstream end of the upstream conduit or the near end of either conduit shaped or fitted so that the downstream end of the upstream conduit fits into the upstream end of the downstream conduit.

Figure 3:
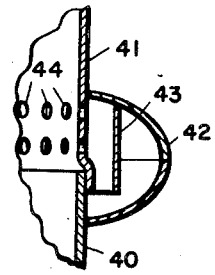
Figure 2:
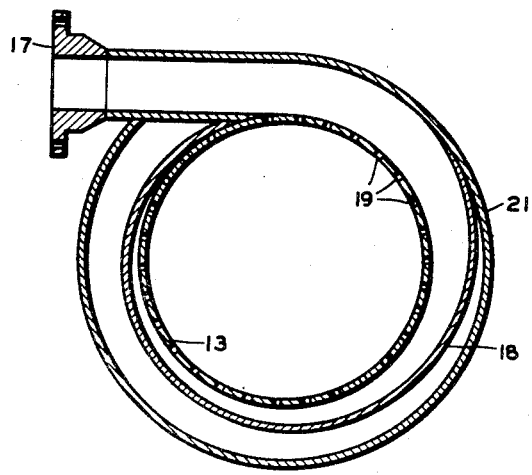
Figure 4:
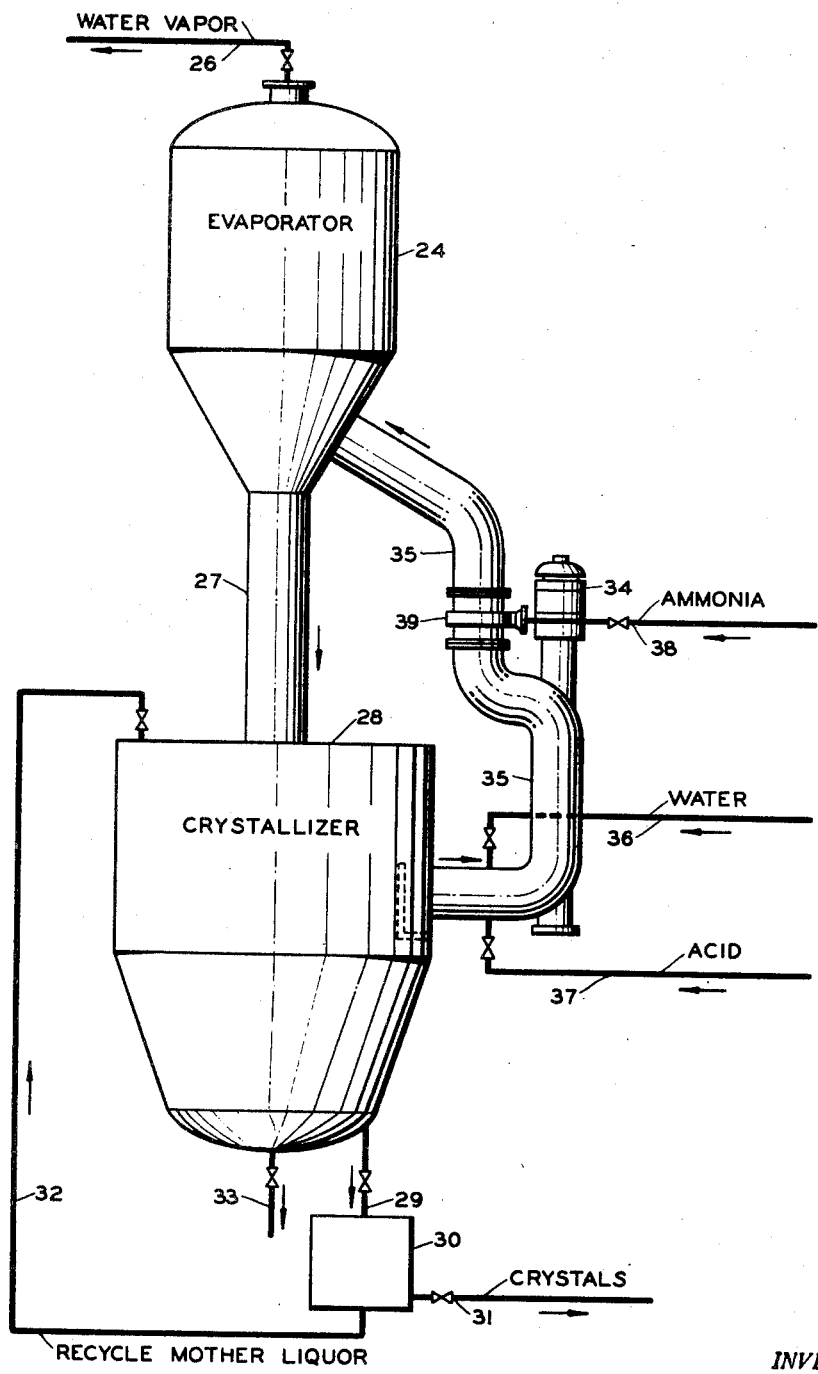

The attached drawings will serve to more fully explain and disclose the apparatus of my invention. For simplicity, the drawings will be discussed in relation to the manufacture of ammonium sulfate, however, other crystalline ammonium salts or other materials may be prepared equally well. As discussed hereinabove, this apparatus is applicable for use wherever a vaporous material is introduced to a flowing liquid reactant or solvent. Figure 1 is a partially cut away front view of a vapor sparger. Figure 2 is a horizontal cross section of the sparger shown in Figure 1 taken along line 2—2. Figure 3 is a cut away view of a second embodiment of my invention as it might be fabricated in a factory. Figure 4 is an elevation view of an apparatus for making crystalline materials using the improved apparatus of my invention.

Refer now to Figure 1 which shows one embodiment of my invention. Number 10 is a vertical cylindrical conduit through which an acidic ammonium sulfate solution is passed in the direction of arrow 11. This conduit is equipped with flange 12 at its lower end to facilitate attachment to another conduit. A second cylindrical conduit 13 forms the upper portion of the sparger and is equipped with flange 14 also to make installation easy. Circular gas tight housing or bustle ring 16 surrounding the ends of conduits 10 and 13 is provided to flexibly or expansibly fasten the conduits together. A vertical cross section of bustle ring 16 is rectangular in shape, however, it may be preferably oval or elliptical to withstand more strain. As shown, in Figure 1, the horizontal portions of bustle ring 16, abut the outer vertical portion and in the embodiment are welded thereto and to conduit sections 10 and 13, respectively. Bustle ring 16 acts to sealingly join conduits 10 and 13, maintaining the upper end of one and the lower end of the other apart from one another. Thus the bustle ring also acts as an expansion joint, allowing longitudinal movement. Inlet 17 is provided in bustle ring 16 for introducing ammonia gas thereto. A spiral baffle 18 originating near inlet 17 is provided within bustle ring 16 and is attached to the upper surface thereof. This baffle which is of continually decreasing diameter terminates at a point about opposite its point of origination and also contacts conduit 13 there. The spiral shape of baffle 18 is provided to aid in directing the flow of ammonia introduced to the sparger and in maintaining an equal ammonia pressure at all points around conduit 13, however, it is not essential and may be eliminated in some cases. The position and shape of baffle 18 are more clearly shown in Figure 2, discussed hereinbelow.

A plurality of holes 19 are provided in the lower end of conduit 13 through which ammonia, which is introduced to bustle ring 16 through inlet 17, is passed into the ammonium sulfate solution passing through the sparger. A suitable diameter for these holes is in the range of 1/8 to 1/4 inch, the size depending on the number used. In this drawing, the holes have been drawn on an enlarged scale to make them more visible and because of the difficulty in drawing them more or less to scale in the drawing which it will be understood is not intended to show any particular scale but only reasonable relative sizes of the various elements comprising it. A ring 20 is welded to the inside of the upper end of conduit 10 and is of such a length that at all times it covers the expansion opening between conduits 10 and 13, overlapping the inner wall of conduit 13. The upper end of ring 20 is in no way attached to the lower end of conduit 13 but slidably engages same. The lower welded end of ring 20 should be ground to a curved surface and polished to present as smooth a surface as possible to the ammonium sulfate solution passing through the sparger. It may also be desirable to grind in a curve and polish the upper end of ring 20.

The advantage of attaching the ring in the manner described above is that it prevents any substantial seepage of solution between the unattached end thereof and conduit 13 into the bustle ring as would be the case if welded at the other end. The reason for preferring the smooth, curved weld is to prevent any growth of crystals which will often occur on rough surfaces.

Refer now to Figure 2 which is a horizontal cross section of the sparger described above. The same parts shown in this drawing as are shown in Figure 1 are similarly numbered. Number 13 is the vertical conduit through which the ammonium sulfate solution is passed. Ammonia gas is introduced to the bustle ring through inlet 17 and is removed therefrom via holes 19 in the wall of conduit 13. Holes 19 are somewhat enlarged to make them more easily visible in the drawing. Spiral baffle 18 which aids the flow of ammonia around the conduit is more clearly shown. Element 21 is the outer wall of bustle ring or housing 16 referred to in the discussion of Figure 1.

Refer now to Figure 3. This cut away drawing shows the essentials of my invention and how the sparger may be fabricateed in another embodiment. The improvement shown in this drawing is the expanded portion of conduit 41, the way the upper portion of conduit 40 is fitted therein allowing the upper end of conduit 40 freedom of vertical (longitudinal) movement due to expansion and contraction, and the elliptical shape of the bustle ring. In this drawing also the holes are somewhat enlarged. Number 42 is the bustle ring, while number 43 indicates the spiral baffle, and number 44 the holes for admission of gas or vapor.

Refer now to Figure 4. Number 24 is an evaporator operated at reduced pressure for removing water from a solution of ammonium sulfate. Line 26 is the outlet for the vapor from the evaporator. A sufficient vacuum is maintained on the evaporator at all times to make the solution therein boil. The supersaturated solution passes from the evaporator through barometric leg 27 to crystallizer 28. The solution from the evaporator which is supersaturated contacts crystals in the crystallizer causing them to grow. In this manner, the supersaturation of the solution is relieved. A crystal slurry or magma from crystallizer 28 is removed via line 29 and is passed therethrough to centrifuge 30 where the crystals are separated from the mother liquor. The crystals are recovered from this apparatus via line 31 and the mother liquor is recycled therefrom via line 32 back into the top of the crystallizer. Line 33 is provided in the center of the bottom of the crystallizer to provide complete drainage when necessary. A certain degree of separation of crystals from mother liquor is obtained within the crystallizer itself because of the weight of the crystals. The crystals are caused to settle out toward the bottom of the crystallizer and thus a solution relatively free of crystals will remain in the top of the crystallizer. This solution is pumped by means of pump 34 through conduit 35 back to the saturator. Line 36 is provided for the introduction of water to conduit 35 to provide sufficient cooling to remove the heat of reaction. Line 37 is provided for introducing additional acid to the solution going to the evaporator. Line 38 introduces ammonia to sparger 39, said ammonia reacting with the acid introduced via line 37 to form more ammonium sulfate and making the process continuous.

The apparatus of Figure 4 discussed above must be fabricated of corrosion resistant metal such as for example low carbon stainless steel. Depending on the particular product to be manufactured, certain conduits carrying non-corrosive material may be made of ordinary steel pipe, however, if at any time it might be desirable for such conduit to carry corrosive material then it also should be of corrosion resistant material. When operating this apparatus for the manufacture of ammonium sulfate, the evaporator is preferably operated at a subatmospheric pressure in the range of 20 to 28 inches of mercury vacuum. Under this pressure the operating temperature will usually vary within the range of 125 to 160° F. and preferably within 140 to 150° F. The rate of injection of reactants depends upon the design capacity of the unit. Injection of 98 per cent sulfuric acid at the rate of seven gallons per minute will produce about 100 tons of ammonium sulfate per day. Approximately five pounds of anhydrous ammonia are required for each gallon of sulfuric acid. These reactants are injected continuously as above described in substantially stoichiometric proportions after operations are under way. For smoothest operation and to avoid loss of ammonia the ammonium sulfate liquor is maintained very slightly acidic, i. e., containing between 0 and 1 per cent excess acid. It is necessary to add approximately two gallons of water for each gallon of sulfuric acid added to the system so that about three-quarters of a pound of water per pound of product ammonium sulfate may be evaporated. The preferred pressure differential between the sparger of my invention and the riser is in the range of 1 to 50 pounds per square inch.

The above discussion in reference to Figure 4 is provided to show where and how the sparger is used in conjunction with plant scale ammonium sulfate manufacturing equipment.

I claim:

1. A sparger comprising two portions of a liquid carrying conduit; means for uniting and maintaining the near ends of said portions axially aligned and slidable toward and away from each other; a resiliently deformable substantially bustle-shaped housing means external of said conduit sealingly joining each of said near ends of said portions of conduit to the other, thus encompassing said near ends; at least one of the said portions at its near end being perforated in a manner to provide fluid communication from within said housing into said conduit; and a vapor conduit communicating the exterior of said housing with the interior of said housing; the said housing by virtue of its shape and attachment to the said portions of the liquid carrying conduit being adapted to cushion pulsations caused by the interreaction of vapor and liquid when vapor is introduced into liquid in said liquid carrying conduit through said housing and said perforations, thus permitting controlled axial movement of said portions of conduit with respect to each other.

2. A sparger according to claim 1 wherein the perforations are substantially uniformly provided around the said perforated conduit portion and wherein there is provided a spiral baffle originating at said conduit, and at its originating end said baffle being sealingly attached to said housing, on one side of said vapor conduit, said baffle at its other end being sealingly attached to said liquid carrying conduit, on the other side of said vapor conduit, one edge of said baffle being sealingly attached to said housing, and to the end of said conduit portion which is perforated to encompass the perforations; thereby to provide a space of gradually diminishing cross-sectional area to insure uniform fluid flow through the perforations of said conduit portion.

3. A sparger according to claim 1 wherein the means for uniting and maintaining the near ends of said portions axially aligned is a sectional conduit of a radius to fit into said conduit portions, is sealingly attached to one of said conduit portions and is in frictional contact with the other of said conduit portions.

4. A sparger according to claim 3 wherein the upstream edge of said conduit section is ground curved and polished smooth to present minimum resistance to liquid passing through the conduit.

5. A sparger according to claim 1 wherein the means for uniting and maintaining the near ends of said portions axially aligned is constituted by an expanded end of one of said conduit portions to enable the other portion to slidably and telescopically engage the same.

6. A sparger comprising two portions of a liquid carrying conduit, an internally disposed collar rigidly fixed to the end of one of said portions for uniting and maintaining the near ends of said portions axially aligned and slidable upon said collar toward and away from each other, a resiliently deformable substantially bustle-shaped housing means external of said conduit sealingly joining each of said near ends of said portions of conduit to the other, thus encompassing said near ends; at least one of the said portions at its near end being perforated in a manner to provide fluid communication from within said housing into said conduit; and a vapor conduit communicating the exterior of said housing with the interior of said housing; the said housing by virtue of its shape and attachment to the said portions of conduit being adapted to cushion pulsations caused by the interreaction of vapor and liquid when vapor is introduced into liquid in said conduit through said housing and said perforations, thus permitting controlled axial movement of said portions of conduit with respect to each other.

7. A sparger comprising two portions of a liquid carrying conduit; means for uniting and maintaining the near ends of the said portions axially aligned and slidable toward and away from each other; a resiliently deformable substantially bustle-shaped housing means external of said conduit sealingly joining each of said near ends of said portions of conduit to the other, thus encompassing said near ends; at least one of the said portions at its near end being perforated in a manner to provide substantially uniform fluid communication from each point within said housing into said conduit; and a conduit communicating the exterior of said housing with the interior of said housing; means within said housing to gradually and uniformly reduce the space within said housing from a point near said conduit, communicating the exterior of said housing with the interior of said housing, around said housing to a point just before again reaching said last mentioned conduit; the said housing by virtue of its shape and attachment to said portions of conduit being adapted to cushion pulsations caused by the interreaction of vapor and liquid when vapor is introduced into liquid in said conduit through said housing and said perforations, thus permitting controlled axial movement of said portions of conduit with respect to each other.

GERALD W. McCULLOUGH.

References Cited in the file of this patent

UNITED STATES PATENTS

| Number | Name | Date |
|---|---|---|
| 953,960 | Koppers | Apr. 5, 1910 |
| 1,060,925 | Maxim | May 6, 1913 |
| 1,594,947 | Hartman et al. | Aug. 3, 1926 |
| 1,747,687 | Wheeler | Feb. 18, 1930 |

FOREIGN PATENTS

| Number | Country | Date |
|---|---|---|
| 166,982 | Great Britain | July 27, 1921 |